Nov. 29, 1955 G. C. SZIKLAI 2,725,418

COLOR TELEVISION RECEIVING SYSTEM

Filed Feb. 21, 1950 2 Sheets-Sheet 1

INVENTOR
George C. Sziklai
BY
ATTORNEY

COLOR TELEVISION RECEIVING SYSTEM

Filed Feb. 21, 1950

2 Sheets-Sheet 2

INVENTOR
George C. Sziklai
BY
ATTORNEY

United States Patent Office 2,725,418

Patented Nov. 29, 1955

2,725,418

COLOR TELEVISION RECEIVING SYSTEM

George C. Sziklai, Princeton, N. J., assignor to Radio Corporation of America, a corporation of Delaware Application February 21, 1950, Serial No. 145,420

8 Claims. (Cl. 178—5.4)

This invention relates to color television signal receiving systems and, particularly, to apparatus for exciting the different color image reproducing means synchronously with the reception of the respective color-representative video signals.

One of the presently used color television systems operates according to the so-called dot or elemental multiplex principle, one form of which is covered in the copending U. S. application of John Evans, Serial No. 111,384, filed August 20, 1949, and entitled "Color Television." According to this principle, the color information of each of the multiplicity of elemental image areas is represented by a group of successive video signals. The color-representative video signals of each elemental image area are transmitted and received successively. At the receiving points, therefore, a video signal wave is produced having instantaneous amplitudes at successive time-spaced intervals representative respectively of the component colors of successive elemental image areas. In order to reproduce an image from video signals of this character, it is necessary to sample the video signal wave at suitable times corresponding to each of the predetermined time-spaced intervals. The information thus derived is utilized to excite the image reproducing means for the production of light of the different component image colors.

An object of the present invention, therefore, is to provide improved apparatus for exciting the different color elements of the image reproducing means synchronously with the reception of the corresponding color representative video signals.

Another object of the invention is to provide relatively simple apparatus having a relatively small number of components for synchronously receiving elemental multiplex video signals and for exciting the image reproducing means.

A further object of the invention is to provide a receiving system for color-representative video signals of the elemental multiplex type in which a single video signal amplifier is employed for all of the color-representative video signals.

Still another object of the invention is to provide an improved receiving system for color-representative video signals of the elemental multiplex type which is adapted for use in conjunction either with a plurality of image reproducing devices each capable of producing a single component image color, or with a single image reproducing device capable of producing all of the component image colors.

In accordance with this invention, the image reproducing means in one form may consist of one or more cathode ray tubes in which different areas of a luminescent screen are selectively excited by one or more electron beams which normally are interrupted. In addition, the complete video signal wave is impressed continuously upon one of the electron beam intensity control electrodes. There also is provided a video signal wave sampler for deriving predetermined color video signal information from the composite wave for the selective excitation of the luminescent screen or screens. Finally, the present invention provides means for concurrently operating the color video signal sampler and an electron beam color keyer which is coupled to the other beam intensity control electrode so that the beam is caused to excite the luminescent screen only during video signal wave sampling periods.

The novel features that are considered characteristic of this invention are set forth with particularity in the appended claims. The invention itself, however, both as to its organization and method of operation as well as additional objects and advantages thereof will best be understood from the following description taken in connection with the accompanying drawings:

Figures 2, 3, 4:
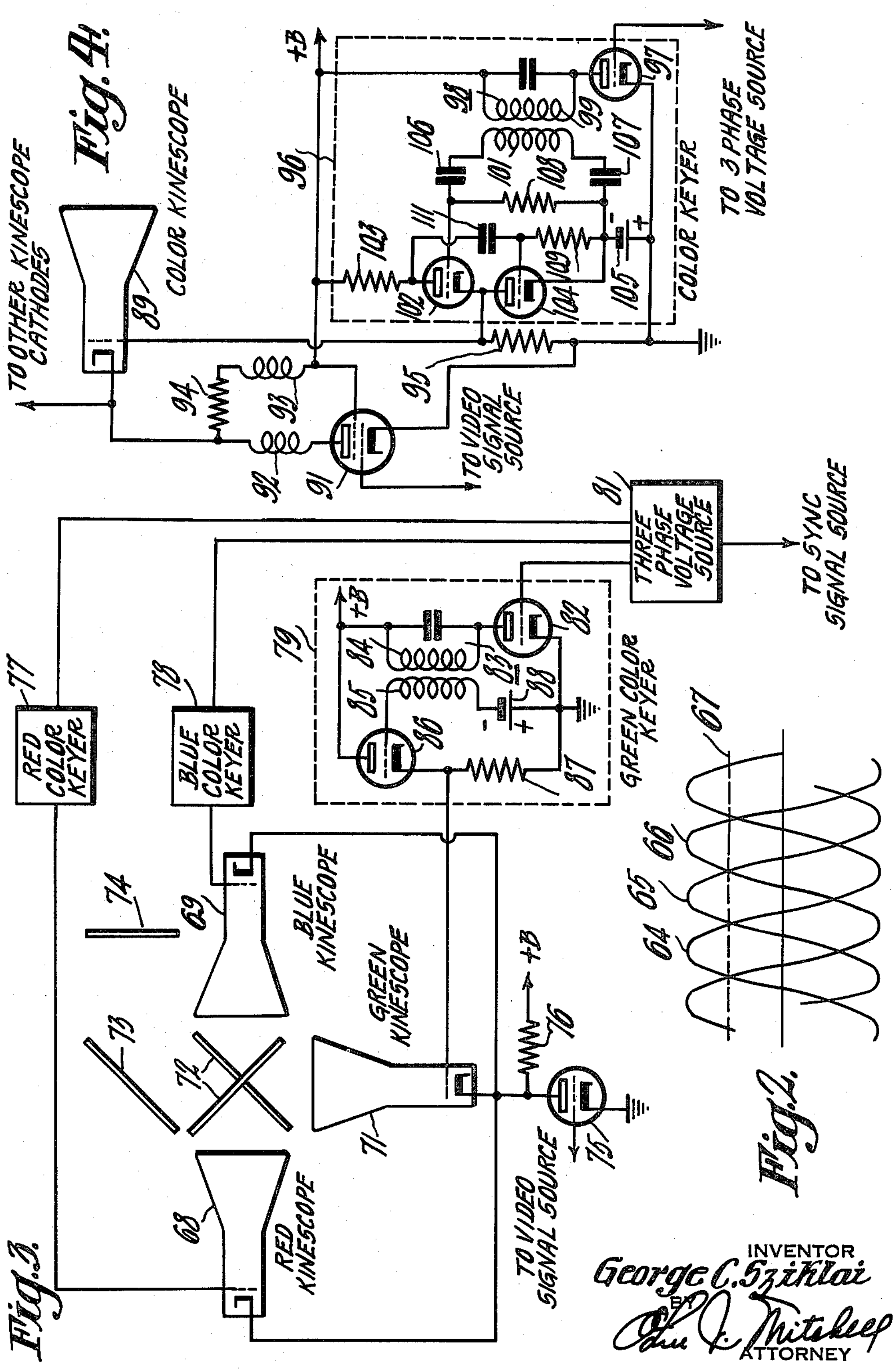
Figure 2 is a graphical representation of the control voltages employed to properly time the operation of the system in any of its various forms disclosed herein.

Figure 3 is a fragmentary circuit diagram of that portion of a color television signal-receiving and image-reproducing system embodying another form of the invention in which a plurality of image reproducing devices are used; and, Figure 4 is another fragmentary circuit diagram of a color television signal-receiving and image-reproducing system embodying the invention in still another alternative form.

Figure 1:
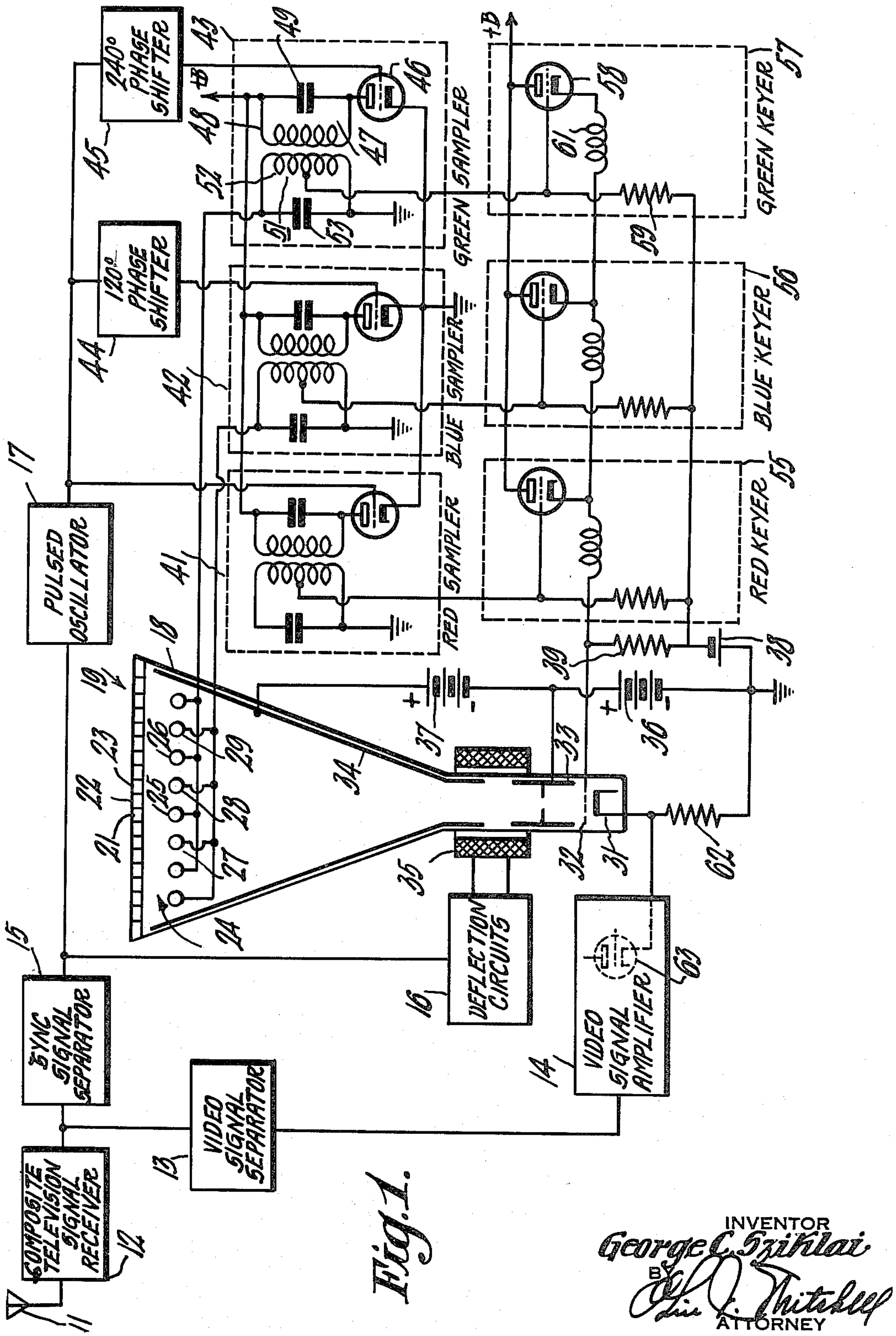
Figure 1 is a circuit diagram of a color television signal-receiving and image-reproducing system embodying one form of the invention as applied to a single image reproducing tube for displaying the image in a plurality of its component colors.

Reference now will be made to Figure 1 of the drawings for a more detailed description of one illustrative form of the invention. The color television signal-receiving and image-reproducing system shown in this figure includes an antenna 11 which is coupled to a composite television signal receiver 12. The signal receiver may include the usual radio frequency signal amplifier, a frequency converter or first detector, an intermediate frequency signal amplifier and a carrier wave demodulator or second detector. It will be understood that there is derived from the output circuit of the receiver 12 a composite television signal waveform including a video signal component and a system control component comprising blanking and horizontal and vertical deflection synchronizing impulses. Also, it will be understood that the video signal waveform has a varying amplitude according to the dot or elemental multiplex principle. Therefore, the successive instantaneous video wave amplitudes represent the different color components of each of a series of elemental image areas.

The output circuit of the signal receiver 12 is coupled to a conventional video signal separator 13 by which the video signal wave is recovered to the exclusion of the blanking and synchronizing signal pulses. The video signal separator is coupled to a video signal amplifier 14.

The output circuit of the signal receiver 12 also is coupled to a synchronizing signal separator 15. This apparatus also may be entirely conventional and serves to develop in its output circuit the horizontal and vertical deflection synchronizing impulses to the exclusion of the video signals. In the usual manner, the output circuit of the synchronizing signal separator is coupled to suitable deflection circuits 16. It will be understood that the deflection circuits include the apparatus necessary to develop sawtooth waveforms at both horizontal or line and vertical or field scanning frequencies.

The output circuit of the synchronizing signal separator also is coupled to the control circuit of a pulsed oscillator 17. The oscillator 17 is essentially a sine wave oscillator operating at the dot or elemental image area repetition rate. At present, in systems operating according to the elemental multiplex principle, it is preferred to operate the pulsed oscillator at approximately 3.6 megacycles per second. Also, an oscillator of this character must be susceptible of synchronizing and phase control by means of impulses impressed thereon substantially at the horizontal or line frequency. One such oscillator which has been successfully employed is of the type shown in the book entitled "Waveforms" published by McGraw Hill Book Co., Inc. in Figure 4–45, appearing at page 143.

There also is provided an image-reproducing device such as a color kinescope 18 capable of reproducing an image in a plurality of its component colors. The color kinescope 18 may be of the type disclosed in U. S. Patent 2,446,791 granted August 10, 1948, to A. C. Schroeder and entitled "Color Television Tube." Essentially, it includes a luminescent screen 19 which, in one form, comprises a multiplicity of phosphor strips capable of emitting light of different colors when excited by an electron beam. The phosphor strips preferably are arranged in repeated groups, a typical one of which comprises a green light-emitting strip 21, a red light-emitting strip 22 and a blue light-emitting strip 23. In order to selectively excite the phosphor areas of the luminescent screen 19, the color kinescope 18 also is provided with a color-selecting electrode 24 in the form of two grids each having conductors extending substantially parallel to the phosphor screen strips. The conductors such as 25 and 26 of one grid are mounted between conductors such as 27, 28 and 29 of the other grid. The conductors are evenly spaced and each has a cross sectional dimension approximately equal to the width of one of the phosphor screen strips. Also, the spacing between adjacent conductors of the color-selecting electrode 24 is approximately equal to the width of one of the phosphor screen strips.

For the purpose of developing an electron beam by which to excite the luminescent screen 19 of the color kinescope 18, there also is provided an electron gun including a cathode 31, an intensity control grid 32, a first or accelerating anode 33 and a second anode 34 in the form of a wall coating. Deflection according to a predetermined scanning pattern of the electron beam over the luminescent screen 19 is controlled by an electromagnetic deflection yoke 35. The deflection yoke is coupled for energization to the deflection circuits 16.

The various electrodes of the color kinescope 18 are energized from a suitable power supply in a conventional manner as indicated schematically by the batteries 36 and 37. In this manner, the first anode 33 is operated at a higher positive potential than the cathode 31 and the second anode 34 is operated at a still more positive potential. Also, the intensity control grid 32 is maintained at a negative potential relative to the cathode 31 by means such as represented by a battery 38 connected between ground or other fixed point of reference potential and the control grid through a resistor 39. In the present case, however, in accordance with one of the features of this invention, the normal negative biasing of the intensity control grid 32 is of a magnitude sufficient to completely interrupt the electron beam. This condition is produced by minimizing or entirely preventing the current conduction in the resistor 39. Current conduction in this resistor is effected in a manner to be described subsequently.

During times when the electron beam is permitted to excite the luminescent screen 19, it is controlled for color-selecting purposes by means of the grid electrode 24 substantially in the following manner. Assume that it is desired to excite the red phosphor area 22. In this case, neither of the color-selecting grid electrode structures is energized. Therefore, that portion of the electron beam which passes between conductors 25 and 28 is entirely unaffected by the color-selecting electrode and impinges directly upon the red phosphor strip 22 which is in register with the space between the conductors referred to. If it is desired to excite the green phosphor strip 21, the conductors 25 and 28 have impressed therebetween a suitable potential to cause the conductor 25 to be of positive polarity relative to the conductor 28. The electron beam, therefore, is deflected to impinge upon the green phosphor strip 21. Similarly, in order to excite the blue phosphor strip 23, the conductor 28 is made of positive polarity relative to the conductor 25.

It will be understood that the illustration of the luminescent screen 19 and color-selecting electrode 24 of the color kinescope 18 is merely representative of the principles underlying the operation of this type of image reproducing device. In practice, the luminescent screen and color-selecting electrode structures will be of such order of fineness that an electron beam having a cross section substantially of elemental image area will have portions thereof traversing several of the spaces between the color-selecting electrode conductors for impingement upon a number of phosphor areas capable of emitting light of a particular color.

The energization of the two grid structures of the color-selecting electrode 24 is effected under the control of the pulsed oscillator 17. This control is accomplished by developing a three phase sine wave voltage. The three phase sine wave voltage is impressed upon red, blue and green color samplers 41, 42 and 43, respectively. The output circuit of the pulsed oscillator 17 is coupled directly to the red sampler 41. The output circuit of the pulsed oscillator is coupled to the blue sampler 42 through a phase shifter 44 capable of producing in its output circuit a sinusoidal voltage having a substantially 120 electrical degree phase-shifted relationship to the voltage derived from the oscillator 17. Similarly, the output circuit of the oscillator 17 is coupled to the green sampler 43 through a 240 degree phase shifter 45. The phase shifters may be of any suitable conventional design such as delay lines and the like. By such a control means, it may be seen that the color samplers 41, 42 and 43 are individually energized at 120 degree intervals of the period of the pulsed oscillator 17.

The color samplers 41, 42 and 43 are similar in their construction. Accordingly, only one such device will be described in detail. The green color sampler 43, for example, includes an electron tube 46 having a cathode connected to ground and a control grid connected to the output circuit of the 240 degree phase shifter 45. The anode of the tube 46 is connected through an inductive-capacitive network 47 to a suitable source of space current indicated at +B. The network 47 comprises the parallel connection of a primary transformer winding 48 and a resonating capacitor 49. The parameters of the network 47 are chosen to produce relatively steep sided impulses by the traversal thereof by space current for the tube 46.

The green color sampler 43 also includes a second inductive-capacitive network 51 comprising a secondary transformer winding 52 and a shunt connected resonating capacitor 53. The primary and secondary windings 48 and 52 are inductively coupled in such polarity to produce an impulse at the high potential terminal of the network 51 of suitable polarity to effect the desired excitation of the luminescent screen 19 of the color kinescope 18. It is assumed for purposes of the present disclosure that there is developed at the high potential terminal of the network 51 an impulse of positive polarity relative to ground. The low potential terminal of the network 51 is maintained substantially at ground potential for alternating currents by means such as a capacitor 54. The high potential terminal of the network 51 is connected to the grid of the color-selecting electrode 24 which includes conductors 25 and 26.

Similarly, the blue color sampler 42, under the control of the sinusoidal voltage derived from the 120 degree phase shifter 44, functions to periodically impress positive voltage impulses upon the grid of the color-selecting electrode 24 which includes conductors 27, 28 and 29.

In this form of the invention utilizing a color kinescope 18 of the type described, it is necessary for the production of red image light that the grid electrode conductors of the color-selecting electrode 24 be unenergized. Accordingly, the red color sampler 41 is not connected to the color-selecting electrode of the color kinescope.

In order that the electron beam developed in the color kinescope 18 be available for the excitation of the luminescent screen 19, there is provided a plurality of color keyers 55, 56 and 57. The keyers 55, 56, and 57 may be conveniently designated as red, blue and green keyers respectively since they function to key the electron beam on for the excitation of the luminescent screen to produce these colors. The details of each of the color keyers are identical. Hence, only the specific structure of the green color keyer 57 will be described in detail. It consists of an electron tube 58 having its anode connected directly to the positive terminal of a source of space current designated as +B. The control grid of the tube 58 is connected to an intermediate terminal of the secondary winding 52 of the green video signal sampler 43. Also, the control grid is negatively biased relative to its associated cathode by means of a connection, which includes a resistor 59, to the negative terminal of the battery 38. It will be understood that the magnitude of the negative grid bias voltage is sufficient to maintain the tube normally non-conducting. The cathode of the tube 58 is connected through a choke coil 61 and similar choke coils of the color keyers 55 and 56 to the terminal of the resistor 39 which is connected to the electron beam intensity control 32 of the color kinescope 18. The function of the choke coils such as 61 is to compensate for the interelectrode capacitances of the color keyer tubes and thereby to permit the development of voltage impulses in the resistor 39 which are relatively steep sided. Thus, the electron beam of the color kinescope may be controlled so that it is keyed on and off abruptly.

The red and blue color keyers 55 and 56 are operated under the control of their associated color samplers 41 and 42 to similarly control the keying of the electron beam of the kinescope in suitable time relation to the video signal sampling to properly excite the luminescent screen 19.

The intensity modulation of the electron beam of the color kinescope 18 is accomplished by varying the potential of the cathode 31 relative to the control grid 32. For this purpose the cathode 31 is connected to ground through a resistor 62. The video signal amplifier 14 is coupled to the ungrounded terminal of the resistor 62 so as to impress the video signals upon the cathode 31 of the kinescope 18 in so-called negative polarity. Obviously, the invention may be embodied in apparatus in such a manner that the video signals are impressed in positive polarity upon the control grid 32 in accordance with the more usual practice. In such a case, the color keyers such as 55, 56 and 57 would be arranged to vary the potential of the cathode 31 in a manner to suitably key the electron beam.

In order to impress the video signals upon the cathode 31 of the color kinescope 18 in negative polarity, the cathode of the output tube 63 of the video amplifier is directly coupled substantially as shown to the ungrounded terminal of the resistor 62. It is seen that such an arrangement obviates the need for a coupling capacitor between the video signal amplifier and the electron beam intensity control electrode of the color kinescope. Consequently, there is no need for the usual apparatus providing for direct current restoration.

It is considered that only a brief further description of the operation of the embodiment of the invention shown in Figure 1 is necessary in view of the foregoing description of the apparatus. In this connection, a reference to Figure 2 of the drawings indicates the relationship between the sinusoidal voltages derived respectively from the pulsed oscillator 17 and the phase shifters 44 and 45. This figure shows the 120 degree phase relationship mutually existing between the three voltages. It may be considered that the waves 64, 65 and 66 represent respectively the voltages derived from the pulsed oscillator 17, the 120 degree phase shifter 44 and the 240 degree phase shifter 45. In order that the respective video signal samplers 41, 42 and 43 and their associated color keyers 55, 56 and 57 be rendered operative only one at a time it is preferable to utilize only the crests of the voltage waves 64, 65 and 66. Accordingly, it will be understood that the electron tubes of the respective video signal samplers are biased so as to operate for the conduction of space current only in response to voltages above a predetermined level such as indicated by the dashed line 67.

It will be understood that the video signal wave derived from the amplifier 14 and impressed upon the cathode 31 of the color kinescope 18 is continuously varying in amplitude. Also, it will be understood that the color information is repeated by the instantaneous amplitudes of the video signal wave only at predetermined instants. In a three color television system, for example, these instants occur at a frequency equal to three times the repetition frequency of the elemental image areas. Consequently, in order to faithfully reproduce a color television image, it is necessary to sample the video signal wave only at these predetermined instants.

At the instant at which the amplitude of the video signal wave impressed upon the cathode 31 of the color kinescope 18 represents the red color component of a particular elemental area of the image to be reproduced, the color sampler 41 is energized by one of the positive peaks of the wave 64 of Figure 2. The blue and green video signal samplers 41 and 42 at this time are inoperative. Consequently, the conductors of the two grids including the conductors 25 and 28 respectively of the color selecting electrode 24 both are at the same potential. The operation of the video signal sampler 41 also energizes the red color keyer 55 to overcome the normal negative biasing of the electron beam intensity control grid 32. The electron beam, having an intensity modulated in accordance with the instantaneous amplitude of the video signal wave impressed upon the cathode 31, traverses the space between color-selecting electrode conductors 25 and 28. Since these conductors both are at the same potential the beam is not deflected and impinges upon the red phosphor strip 22.

At the next succeeding instant, the blue color keyer 42 is rendered operative by one of the positive peaks of the wave 65 of Figure 2. It is assumed that a positive impulse is impressed upon the conductors of one of the color-selecting electrode grids which includes the conductor 28. At the same time, the blue color keyer 56 is energized to again key the electron beam of the color kinescope. The intensity of the electron beam in this case is controlled by the instantaneous amplitude of the video signal wave representative of the blue color component of the elemental image area. In traversing the space between adjacent conductors of the two color-selecting electrode grids such as conductors 25 and 28, the electron beam is deflected for excitation of the blue phosphor strip 23 by virtue of the fact that the conductor 28 has a positive potential relative to that of the conductor 25.

At the next succeeding instant the green color keyer 43 is operated under the control of one of the positive peaks of the wave 66 of Figure 2, thereby impressing a potential upon the conductor 25 which is positive relative to that of the adjacent conductors such as 28. The green color keyer 57 functions to key the electron beam on with an intensity representative of the green color component of the elemental image area as determined by the instantaneous amplitude of the video signal voltage wave impressed upon the cathode 31. In traversing the space between conductors 25 and 28, the electron beam in this case is deflected for impingement of the green phosphor strip 21 by reason of the positive potential of the conductor 25 relative to that of the conductor 28.

Reference is now made to Figure 3 of the drawings showing another form of the invention embodied in a color television image reproducing system having a separate kinescope for each of the colors in which the image is to be reproduced. The image reproducing apparatus includes red, blue and green kinescopes 68, 69 and 71, respectively. These kinescopes may be mounted in substantially the arrangement shown so that, by means of a suitable color-selecting apparatus such as a pair of crossed dichroic reflectors 72, the three color images may be projected by means of a plane mirror 73 onto a viewing screen 74.

The cathodes of the color kinescopes 68, 69 and 71 are commonly connected to the anode of an electron tube 75 which may be included in the output stage of the video signal amplifier. Space current for the tube is provided by means of a connection to a suitable power supply designated as +B through a resistor 76. It may be seen, therefore, that the cathodes of the color kinescopes normally are maintained at a relatively high positive potential relative to ground.

The control grids of the respective red, blue and green kinescopes 68, 69 and 71 are connected to red, blue and green color keyers 77, 78 and 79 respectively. The color keyers are rendered operative in a predetermined sequence under the control of a three phase voltage derived from a source 81 to which the color keyers are coupled. It will be understood that the three phase voltage source may be similar to that shown in the embodiment of the invention illustrated in Figure 1 and comprising a pulsed oscillator synchronously controlled by the horizontal synchronizing signals and two phase shifters.

Only one of the color keyers has been shown in detail for the reason that all may be identical. The green color keyer 79 comprises an electron driving tube 82. The cathode of this tube is grounded and the control grid is coupled to the three phase voltage source for energization by one of the voltage waves derived therefrom. The anode of the tube 82 is coupled to a source of space current indicated at +B through an inductive-capacitive network 83 similar to the corresponding networks of the embodiment of the invention shown in Figure 1. The winding 84 of the network 83 is inductively coupled to a winding 85. The color keyer also includes an electron tube 86 having a cathode connected through a resistor 87 to ground. The control grid of the tube 86 is coupled through the winding 85 and a source of negative biasing voltage represented by the battery 88 to ground. The negative biasing of the control grid of the tube 86 relative to its cathode is sufficient to maintain the tube non-conducting in the absence of a voltage developed in the winding 85. The anode of the tube 86 also is connected to +B for the supply of space current thereto.

The cathode of tube 86 is connected to the control grid of the green kinescope 71 substantially as shown. Accordingly, during non-conducting periods of the tube 86, the control grid of the kinescope 71 is maintained substantially at ground potential. Thus, by reason of the relatively high positive potential impressed upon the cathode of the kinescope 71, the electron beam therein is completely interrupted.

The control grids of the red and blue kinescopes 68 and 69 also are maintained substantially at ground potential during inoperative periods by means of the red and blue color keyers 77 and 78. The keyers are momentarily operated under the control of the sinusoidal voltages of proper phase derived from the source 81 to momentarily raise the potential on the respective control grids of the red and blue kinescopes to a sufficient positive potential above ground to key the electron beams on in these tubes.

In view of the description of the operation of the embodiment of the invention shown in Figure 1, it is believed unnecessary to describe in detail the operation of the embodiment of the invention shown in Figure 3. It should be noted, however, that the keying of the electron beams of the color kinescopes 68, 69 and 71 effects the desired sampling of the video signal wave.

Still another embodiment of the invention is shown in Figure 4 to which reference now will be made. It is assumed that the image-reproducing apparatus is of a character similar to that shown in Figure 3. A separate color kinescope is provided for each of the component image colors and the images reproduced thereby are optically combined in a suitable manner. In the form of the invention shown in Figure 4, therefore, only one such color kinescope is shown, together with a color keyer for the operation thereof. It will be understood that other color kinescopes and associated keyers will be provided for each of the other component colors of the image to be reproduced.

The color kinescope 89 is provided with an electron gun including a cathode and an intensity control grid. The cathode of the tube 89 is connected to the output circuit of a video amplifier which includes an electron tube 91. The video signal is impressed upon the control grid of the tube 91 and the cathode of this tube is connected to ground. The anode of the tube is connected to a source of space current indicated at +B through a circuit including coils 92 and 93 and a resistor 94. This inductive resistive network is a conventional anode circuit facility usually provided in video signal amplifiers for peaking the response characteristic of the amplifier and neutralizing interelectrode tube capacitance. A screen grid of the tube 91 has impressed thereon a positive potential of suitable conventional magnitude. It will be understood that the anode circuit of the tube 91 is coupled in parallel to the cathodes of the electron guns in all of the color kinescopes such as 89. Accordingly, the kinescope cathodes are maintained at all times at some positive potential relative to ground.

The control grid of the kinescope 89 is connected through a resistor 95 of relatively high value to ground. Accordingly, the electron beam of the kinescope 89 normally is interrupted since the control grid is highly negative relative to its associated cathode.

There also is provided a color keyer 96 by means of which to momentarily overcome the normal negative biasing of the control grid of the kinescope 89 so that the electron beam is periodically keyed on. The color keyer 96 includes a driving electron tube 97 which is controlled by means of a connection between its control grid and a source of voltage of suitable phase derived from a three phase control voltage source as indicated. It will be understood that the three phase control voltage is of the same general character as that shown in the other embodiments of the invention. The anode circuit of the driving tube 97 includes an inductive-capacitive network 98, the winding 99 of which is inductively coupled to a secondary winding 101.

The color keyer also includes an electron tube 102, the anode of which is connected through a resistor 103 to a source of space current indicated at +B. The cathode of the tube 102 is connected to the anode of a variable impedance tube 104. The cathode of this tube is connected through a source of negative biasing voltage represented by the battery 105 to ground. The impedance represented by the space discharge path of the tube 104 is seen to be connected substantially in parallel with the resistor 95 by means of which the intensity control grid of the color kinescope 89 normally is biased relative to its associated cathode to interrupt the electron beam.

The operation of the tube 102 is controlled by a coupling including a capacitor 106 connected between the control grid of the tube and one terminal of the secondary winding 101. The other terminal of the secondary winding 101 is maintained at a substantially fixed reference potential for alternating currents by means of a capacitor 107 connected to ground through the battery 105. The grids of the tubes 102 and 104 normally are negatively biased relative to their associated cathodes by means of connections through respective resistors 108 and 109 to the negative terminal of the battery 105. The operation of the variable impedance tube 104 is controlled from the output circuit of the tube 102 by means of a coupling capacitor 111 connected between the control grid of the tube 104 and the anode of the tube 102.

The operation of the color keyer in accordance with this embodiment of the invention is, in some respects, different from that of the other two previously described embodiments of the invention. Normally, the tubes 97 and 102 are non-conducting. By virtue of the coupling between the output circuit of the tube 102 and the control grid of the tube 104, the latter tube normally is conducting. Therefore, there is impressed upon the electron beam intensity control grid of the color kinescope 89 a negative potential of sufficient magnitude relative to that of the cathode to completely interrupt the electron beam. When it is desired to sample the video signal wave impressed upon the cathode of the kinescope 89 for the production of an elemental portion of the image to be reproduced in the color represented by the kinescope 89, the driving tube 97 is energized by means of one of the three phase voltages. Accordingly, there is impressed upon the control grid of the color keyer tube 102 a voltage of positive polarity to render this tube conducting. The decreased anode potential produced by the conduction of space current through the resistor 103 effects the impression of a negative impulse upon the control grid of the variable impedance tube 104. This causes the variable impedance tube to be rendered non-conducting, thereby removing the negative bias from the intensity control grid of the kinescope 89. Consequently, the electron beam is keyed on at an intensity controlled by the instantaneous amplitude of the video signal wave impressed upon the cathode.

It will be understood that the keyers for the other color kinescopes will be operated at other instants in substantially the same manner described for the keyer 96 so as to key on the electron beams of the other kinescopes at times suitable to properly sample the video signal wave impressed upon the cathodes thereof.

It may be seen that the novel video signal wave sampling circuits of this invention provide an improved color television image-reproducing system. One advantage over prior art systems is that only a single video signal amplifying channel is needed. Many electron tubes and their auxiliary circuit components, thus, are eliminated. It also is possible to obviate the use of a direct current reinserter.

The novel sampling circuits are useful in conjunction with a plurality of color kinescopes or with a single multicolor kinescope. The single color kinescope need not be of the single electron gun type disclosed herein. Alternatively, a color kinescope with two or more electron guns may be used. A typical one of the latter type of color kinescope is disclosed in U. S. Patent No. 2,481,839, granted to A. N. Goldsmith on September 13, 1949, and titled "Color Television."

What is claimed is:

1. A color television image-reproducing system, comprising a color kinescope of the type having a luminescent screen capable of emitting differently colored light when selectively excited by an electron beam, a color-selecting electrode energizable to selectively excite said luminescent screen and an electron gun including a pair of intensity control electrodes for developing an electron beam to excite said screen, means for receiving a video signal wave having different instantaneous amplitudes representative respectively of the component colors of successive elemental areas of the image to be reproduced, means impressing said video signal wave upon one of said electron gun electrodes, a plurality of color samplers coupled to said color-selecting electrode to energize said color-selecting electrode, means coupled to said signal-receiving means to render said color samplers operative in succession once for every elemental area of the image to be reproduced, and a plurality of electron beam keyers operative synchronously with said color samplers and coupled to the other of said electron gun electrodes to cause said electron beam to be keyed on in synchronism with the reception of the different instantaneous amplitudes of said video signal wave representative of the different image component colors.

2. A color television image-reproducing system, comprising a color kinescope of the type having a luminescent screen capable of emitting differently colored light when selectively excited by an electron beam, a color-selecting electron beam controlling electrode energizable to selectively excite said luminescent screen and an electron gun including a cathode electrode and an intensity control electrode for developing an electron beam to excite said screen, means normally cutting off said electron beam, means for receiving a video signal wave having different instantaneous amplitudes representative respectively of the component colors of successive elemental areas of the image to be reproduced, means impressing said video signal wave upon one of said electron gun electrodes, a plurality of color samplers coupled to said color-selecting electrode to energize said color-selecting electrode, means coupled to said signal-receiving means to render said color samples operative in succession once for every elemental area of the image to be reproduced, and a plurality of electron beam keyers coupled to said color samplers and also to the other of said electron gun electrodes to cause said electron beam to be keyed on in synchronism with the reception of the different instantaneous amplitudes of said video signal wave representative of the different image component colors.

3. A color television image-reproducing system, comprising a color kinescope of the type having a luminescent screen capable of emitting differently colored light when selectively excited by an electron beam, a color-selecting electrode energizable for controlling an electron beam to selectively excite said luminescent screen and an electron gun including a cathode electrode and an intensity control grid electrode for developing an electron beam to excite said screen, means coupled to said electron gun normally cutting off said electron beam, means for receiving a television signal including a video signal wave having different instantaneous amplitudes representative, respectively, of the component colors of successive elemental areas of the image to be reproduced, a video signal amplifier coupled between said signal-receiving means and one of said electron gun electrodes, a plurality of color samplers coupled to said color-selecting electrode to energize said color-selecting electrode, means coupled to said signal-receiving means for control thereby to render said color samplers operative in succession once for every elemental area of the image to be reproduced, and a plurality of electron beam keyers coupled to respective ones of said color samplers and also to the other of said electron gun electrodes to cause said electron beam to be keyed on periodically in synchronism with the reception of the different instantaneous amplitudes of said video signal wave representative of the different image component colors.

4. A color television image-reproducing system, comprising a color kinescope of the type having a luminescent screen including a plurality of phosphor areas capable respectively of emitting differently colored light, a color-selecting electrode periodically energizable for deflecting an electron beam to selectively excite said differently colored phosphor areas and an electron gun including a cathode and an intensity control grid for developing an electron beam to excite said screen, means impressing a biasing potential between said control grid and cathode normally cutting off said electron beam, means for receiving a composite television signal including horizontal and vertical synchronizing impulses and a video signal wave having different instantaneous amplitudes representative, respectively, of the component colors of successive elemental areas of the image to be reproduced, a video signal amplifier coupled between said signal-receiving means and the cathode of said electron gun, a plurality of color samplers coupled to said color-selecting electrode to energize said color-selecting electrode, means coupled to said signal-receiving means and controlled by said horizontal synchronizing impulses to render said color samplers operative in succession once for every elemental area of the image to be reproduced, and a plurality of electron beam keyers coupled for operative control to respective ones of said color samplers and also coupled to said intensity control grid to cause said electron beam to be keyed on periodically in synchronism with the reception of the different instantaneous amplitudes of said video signal wave representative of the different image component colors.

5. In a color television image-reproducing system of the type employing a color kinescope capable of reproducing an image in a plurality of different colors in response to the reception of a video signal wave having different instantaneous amplitudes representative respectively of the color components of successive elemental areas of the image to be reproduced, color-selecting apparatus comprising an electron gun for said kinescope including a pair of electron beam intensity control electrodes, means for impressing said received video signal wave upon one of said electron beam intensity control electrodes, a plurality of beam keyer electron tubes, a load impedance device coupled in common to all of said electron tubes, means coupling said load impedance device to the other one of said beam intensity control electrodes to key said electron beam on and off in response to keying voltages developed in said load impedance device by the traversal thereof by electron current in said electron tubes, and means operating synchronously with the reception of the different instantaneous amplitudes of said video signal wave to vary the electron current in said electron tubes in a predetermined succession.

6. In a color television image-reproducing system of the type employing a color kinescope capable of reproducing an image in a plurality of different colors in response to the reception of a video signal wave having different instantaneous amplitudes representative respectively of the color components of successive elemental areas of the image to be reproduced, color-selecting apparatus comprising an electron gun for said kinescope including a cathode and an electron beam intensity control electrode, means for impressing said received video signal wave upon said electron gun cathode, a plurality of beam keyer electron tubes each having an anode, a cathode and a grid for controlling the anode-to-cathode electron tube current, a load impedance device coupled to the cathodes of all of said electron tubes, means coupling said load impedance device to said electron gun intensity control electrode to key said electron beam on and off in response to keying voltages developed in said load impedance device by the traversal thereof by the anode-to-cathode current in said electron tubes, and means operating synchronously with the reception of the different instantaneous amplitudes of said video signal wave to vary the anode-to-cathode current in said electron tubes in a predetermined succession.

7. A color television image-reproducing system, comprising a plurality of kinescopes, one for each of the component colors in which the image is to be reproduced, each of said kinescopes having a luminescent screen and an electron gun including a cathode and an intensity control grid for developing an electron beam to excite said screen, means normally biasing said control grids sufficiently negative relative to their associated cathodes to interrupt said beams, means for receiving a composite television signal including horizontal and vertical synchronizing impulses and a video signal wave having different instantaneous amplitudes representative respectively of the component colors of successive elemental areas of the image to be reproduced, a single video signal amplifier coupled between said signal receiving means and the cathodes of all of said kinescopes, a beam keyer coupled to each kinescope grid and operative to overcome said normal grid bias to cause each electron beam to excite its associated screen in accordance with the video signal amplitude impressed upon said cathodes, and means coupled to said signal receiving means and controlled by said horizontal synchronizing impulses to render said beam keyers operative in succession once for every elemental area of the image to be reproduced.

8. A color television image-reproducing system, comprising a color kinescope of the type having a luminescent screen capable of emitting differently colored light when selectively excited by an electron beam, a color-selecting electrode located adjacent to said screen and energizable to selectively excite said luminescent screen, an electron gun including a pair of intensity control electrodes for developing an electron beam to excite said screen, means for receiving a video signal wave having different instantaneous amplitudes representative respectively of the component colors of successive elemental areas of the image to be reproduced, means impressing said video signal wave upon one of said electron gun electrodes, a plurality of color samplers coupled to said color-selecting electrode to energize said color-selecting electrode, and means coupled to said signal-receiving means to render said color samplers operative in succession once for every elemental area of the image to be reproduced.

References Cited in the file of this patent

UNITED STATES PATENTS

| | | |
|---|---|---|
| 2,294,820 | Wilson | Sept. 1, 1942 |
| 2,423,769 | Goldsmith | July 8, 1947 |
| 2,438,269 | Buckbee | Mar. 23, 1948 |
| 2,446,440 | Swedlund | Aug. 3, 1948 |
| 2,446,791 | Schroeder | Aug. 10, 1948 |
| 2,461,515 | Bronwell | Feb. 15, 1949 |
| 2,573,777 | Sziklai | Nov. 6, 1951 |
| 2,596,918 | Schroeder | May 13, 1952 |

FOREIGN PATENTS

| | | |
|---|---|---|
| 443,896 | Great Britain | Mar. 10, 1936 |
| 866,065 | France | June 16, 1941 |